(12) United States Patent
Cheng et al.

(10) Patent No.: US 8,332,797 B2
(45) Date of Patent: Dec. 11, 2012

(54) PARAMETERIZED DUMMY CELL INSERTION FOR PROCESS ENHANCEMENT

(75) Inventors: Ying-Chou Cheng, Zhubei (TW);
Tsong-Hua Ou, Taipei (TW); Wen-Hao Liu, Zhubei (TW); Ru-Gun Liu, Hsinchu (TW); Wen-Chun Huang, Xi-Gang Xiang (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 36 days.

(21) Appl. No.: 12/959,150

(22) Filed: Dec. 2, 2010

(65) Prior Publication Data

US 2012/0144361 A1 Jun. 7, 2012

(51) Int. Cl.
*G06F 17/50* (2006.01)

(52) U.S. Cl. .............. 716/119; 716/50; 716/51; 716/52; 716/53; 716/54

(58) Field of Classification Search ............. 716/50, 716/51, 52, 53, 54, 55
See application file for complete search history.

(56) References Cited

U.S. PATENT DOCUMENTS

2005/0067286 A1* 3/2005 Ahn et al. ............ 205/70
2010/0019329 A1* 1/2010 Poon et al. .......... 257/390

* cited by examiner

*Primary Examiner* — Jack Chiang
*Assistant Examiner* — Brian Ngo
(74) *Attorney, Agent, or Firm* — Haynes and Boone, LLP (57) ABSTRACT

The present disclosure relates to parameterized dummy cell insertion for process enhancement and methods for fabricating the same. In accordance with one or more embodiments, methods include providing an integrated circuit (IC) design layout with defined pixel-units, simulating thermal effect to the IC design layout including each pixel-unit, generating a thermal effect map of the IC design layout including each pixel-unit, determining a target absorption value for the IC design layout, and performing thermal dummy cell insertion to each pixel-unit of the IC design layout based on the determined target absorption value.

18 Claims, 11 Drawing Sheets

PARAMETERIZED DUMMY CELL INSERTION FOR PROCESS ENHANCEMENT

BACKGROUND

A semiconductor manufacturer typically forms integrated circuits in different regions of a semiconductor wafer. Integrated circuits formed on a substrate of the semiconductor wafer typically include a plurality of semiconductor structures. Various processing techniques utilized by semiconductor manufacturers include etching, lithography, ion implantation, thin film deposition, and thermal annealing.

However, in conventional fabrication of integrated circuits, the process of thermal annealing a semiconductor wafer may introduce non-uniformity in device performance of the integrated circuits. As such, electrical performance of some semiconductors devices may vary, which may result in degradation of quality for the integrated circuits.

Thus, there is a need for an improved method of manufacturing integrated circuits to overcome the deficiencies of conventional thermal annealing.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion. It should be appreciated that like reference numerals are used to identify like elements illustrated in one or more of the figures.

DETAILED DESCRIPTION

It is understood that the present disclosure provides many different forms and embodiments, and that specific embodiments are provided only as examples. Further, the scope of the present disclosure will only be defined by the appended claims. In the drawings, the sizes and relative sizes of layers and regions may be exaggerated for clarity. It will be understood that when an element or layer is referred to as being "on," or "coupled to" another element or layer, it may be directly on, or coupled to the other element or layer, or intervening elements or layers may be present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may likewise be interpreted accordingly.

Hereinafter, embodiments of the present invention will be explained in detail with reference to the accompanying drawings.

Embodiments of the present disclosure relate to parameterized dummy cell insertion for process enhancement of integrated circuit (IC) design layout. Customizable/adjustable process uniformity retargeting and adjustment for fullchip manufacturing is provided as process/design refinement for semiconductor processing and IC design layout. Process uniformity based patterning and dummy-filling are compatible with deep micron/submicron device engineering/integrated circuit design flow. In various aspects, the processes provided herein may be pre-identified as a fundamental patterning optimization platform for semiconductor processing and design rules for thermal effect, chemical mechanical planarization (CMP), and topography uniformity criteria. In one implementation, process uniformity friendly polygons may be added-on and corrected around devices or circuits. The processes provided herein may provide a higher degree of freedom during dummy polygon insertion for fabricators on logic block/IP and standard cell abutment analysis and design. Performance targeted process adjustment, e.g., CMP, CAA (Critical Area Analysis), Thermal, and Topography optimization for frontend and backend processes.

Embodiments of the present disclosure provide for silicon calibrated process enhancement and thermal effect optimization. The behavior of thermal distribution and geometry-based libraries may be input components of the processes provided herein for optimizing performance and/or thermal effect. Thermal effect, CMP, and topography aware patterning, retargeting criteria and/or rules may be applied to calculate and correct a final target (e.g., thermal effect target). In one aspect, performance-aware refers to uniformity control for thickness, thermal, and/or some other related behaviors during device processing in VLSI (Very Large Scale Integration), which may be considered an important index for manufacturing and circuit design. In another aspect, local process uniformity control across chip or around a critical circuit block may provide stable electrical properties, process uniformity, and integrated layout optimization through semiconductor processing.

Embodiments of the present disclosure provide designed and simulated optical libraries to be original inputs. Real silicon calibrated data may be utilized for modeling and calibration. In one aspect, improved process uniformity across chip may be reached by adjusting parameterized dummy cells locally. A process effect simulator may be created prior to applying the proposed technique. The process provided herein may be utilized for CMP, CAA, process window characterization, and thermal effect process.

Embodiments of the present disclosure comprise an adjustable process optimization approach to integrated circuit process flow that may be applied to CMP, CAA, Thermal, and Topography based effects or electrical design for manufacturability (eDFM) awareness. In one aspect, Auto-P&R (place and route) optimization for circuit and process.

Accordingly, embodiments of the present disclosure provide an efficient and cost-effective dummy-fill process to improve manufacturing yield and to simplify complex integrated circuit design and process flow.

Figure 1A:
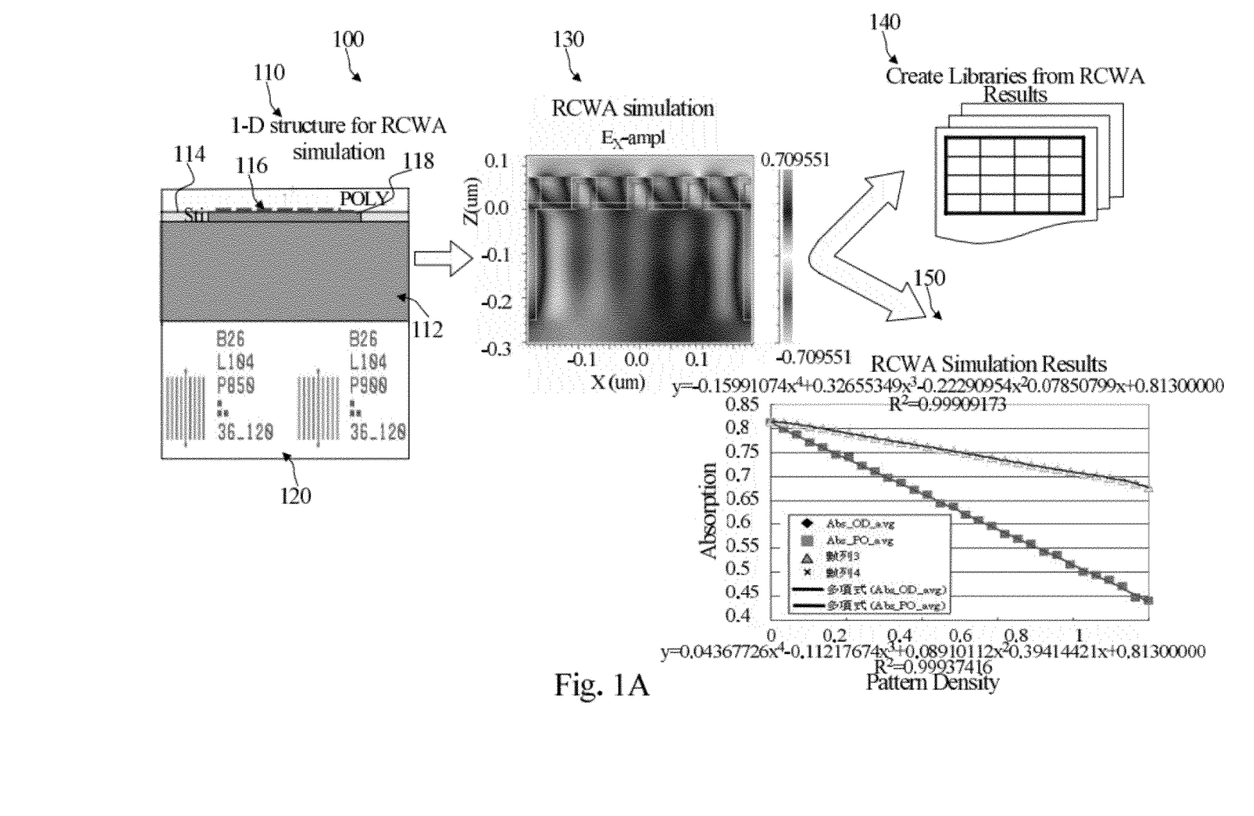
FIGS. 1A-1C show various parameterized cell preparation process flows for thermal effect optimization, in accordance with embodiments of the present disclosure.

FIG. 1A shows a parameterized cell preparation process flow for optimization of thermal effect, in accordance with embodiments of the present disclosure. In various implementations, thermal effect optimization may be performed for various annealing processes, such as rapid thermal annealing (RTA), flash annealing, and/or laser spike annealing (LSA), in accordance with embodiments of the present disclosure.

In one implementation, rigorous coupled wave analysis (RCWA) may be utilized for optical simulations. For example, referring to FIG. 1A, a one-dimensional (1-D) effect may be calculated by RCWA directly for any type of semiconductor structure 110. In another example, a two-dimensional (2-D) effect may be extracted by convolution of the optical simulation and pattern for any type of semiconductor structure. Optical effects may be lumped together for layout effect characterization. In one aspect, RCWA is a simplified form of periodic simulation.

In one implementation, a CD/Space test key 120 for the semiconductor structures 110 may be generated for RCWA simulation. In one aspect, the critical dimension (CD) of integrated circuits has decreased to sub-wavelength conditions for optical lithography, and the critical dimension of integrated circuits may be close to or may be smaller than the exposure wavelength.

In various embodiments, the semiconductor structures 110 may include shallow trench isolation (STI) features, poly-silicon gates, lightly doped drain (LDD) regions, doped wells, contacts, vias, metal lines, or various other type of circuit patterns or features to be formed on a semiconductor wafer. In other various embodiments, the semiconductor structures may include various semiconductor devices including active devices and/or passive devices. The active devices may include transistors, such as field effect transistors (FETs) including metal-oxide-semiconductor (MOS) FETs. The semiconductor devices may include memory devices, such as static random access memory (SRAM) cells, which may include various capacitors and transistors configured and coupled to be functional for data storage and access.

In one aspect, if pattern density is not uniformly distributed, fabrication variation may be introduced when circuit patterns are transferred to the wafer. For example, a thermal annealing process may be implemented at various stages in wafer fabrication, such as an activation annealing process to reduce defects and activate doped species after ion implantation. However, thermal effect may not be globally uniform across the wafer, and as a result, the thermal annealing effect may vary from location to location on the wafer, which may cause the circuit to exhibit electrical performance variation over the locations. For instance, when annealing temperature is below or above the expected annealing temperature within a local circuit environment, threshold voltage and saturation current of a field-effect transistor (FET) may be out of specification due to underdose or overdose annealing. As such, embodiments of the present disclosure provide an IC design structure having circuit patterns and thermal dummy features to achieve a uniform annealing effect, and embodiments of the present disclosure provide a method for incorporating thermal dummy features into an IC design layout for optimized circuit performance.

In one aspect, as described in greater detail herein, thermal dummy features may be inserted in the circuit pattern for thermal effect, and since the thermal dummy features are not electrically coupled to the functional circuit, they do not have any direct electrical function to the circuit. Therefore, those features are referred to as thermal dummy features. The thermal dummy features may be incorporated into an IC design layout prior to masking. The thermal dummy features may be added to the IC design, transferred to a mask, and then transferred to a wafer so as to contribute to the thermal annealing process applied to the wafer. The thermal dummy features may be formed of the same material as the semiconductor structures to be formed on the wafer. For example, if the IC design layout is for STI, then the thermal dummy features comprise STI, and if the IC design layout is for poly-silicon gates, then the thermal dummy features comprise poly-silicon gates.

In another example, a chemical mechanical planarization (CMP) process may be applied to a wafer to achieve a globally planarized surface. However, when the circuit patterns, such as STI features or metal lines, are not uniformly distributed, the global planarizing effect to the wafer may be reduced or degraded. Therefore, dummy insertion may be applied to the IC design layout for optimized CMP effect. Various sub-resolution assistant features may be incorporated into the IC design layout to achieve an optimized imaging effect when the circuit patterns are transferred from mask to wafer.

Referring to FIG. 1A, the semiconductor structure 110 may include a semiconductor substrate 112. The semiconductor substrate 112 may include silicon (Si), germanium (Ge), or some combination of silicon-germanium. The semiconductor substrate 112 may comprise other semiconductor materials, such as diamond, silicon-carbide, gallium-arsenic (GaAs), gallium-arsenic-phosphorous (GaAsP), aluminum-indium-arsenic (AlInAs), aluminum-gallium-arsenic (AlGaAs), gallium-indium-phosphorous (GaInP), or some other proper combination thereof. The semiconductor substrate 112 may include a bulk semiconductor, such as bulk silicon, and an epitaxial silicon layer formed on the bulk silicon.

In one embodiment, STI features 114 formed in the semiconductor substrate 112 may be designed for isolation. The STI features 114 may define various active regions where the semiconductor substrate 112 is uncovered by isolation features. Various doping features and active devices may be formed in the active regions.

In one embodiment, other suitable isolation features 118, such as local oxidation of silicon (LOCOS) may be utilized. The OD features 118 may define various oxide regions where the semiconductor substrate 112 is isolated from gate features 116.

In one embodiment, the semiconductor structure 110 may include various gates 116 disposed on substrate 112. Each gate 116 may include a gate dielectric material and a gate electrode disposed on the gate dielectric. In various embodiments, the gate dielectric may includes silicon-oxide, high-k dielectric material, or some combination thereof. The gate electrode may include doped poly-silicon, metal, or some combination thereof. A pair of source and drain regions may be formed in the substrate 112 and interposed by the gates 116 to form a functional FET. In one aspect, the gates 116 may be disposed on an isolation feature as a dummy feature for fabrication purposes, such as RTA, CAA, or CMP process uniformity and/or optical proximity correction (OPC) effect.

The manufacturing processes to form the semiconductor structure 110 may utilize various thermal annealing steps that include, but are not limited to, thermal annealing to form STIs and thermal annealing applied to the semiconductor substrate after an ion implantation process. As described herein, thermal annealing process may generate different thermal effect in various local environments of the wafer due to pattern characteristics. For example, when a laser spike annealing (LSA) is utilized for thermal annealing after ion implantation, a corresponding annealing effect variation may occur with significant impact to circuit quality and electrical performance. LSA utilizes laser energy for rapid thermal annealing.

Referring to FIG. 1A, RCWA simulation 130 is performed to create libraries 140 from the RCWA results 150. The libraries may include one or more tables that list the absorbance and/or reflectance numbers for the 1-D or 2-D structure simulation. In one example, RCWA simulation 130 may provide RCWA simulation results 150 including graphical analysis of pattern density versus absorption for 1-D or 2-D structures. In another example, RCWA simulation 130 may provide RCWA simulation results 150 including graphical analysis of pattern density versus reflectance for the 1-D or 2-D structure. In one aspect, the library stores data and information related to the absorption of poly and OD, and the library stores data layout results for poly and OD. In another aspect, the data may be utilized for table look-up.

Conventional dummy insertion techniques are utilized in current layer planarization for backend processes. However, few of these conventional techniques focus on a frontend thermal balance effect for device performance, and some of these techniques fail to consider the impact of device behavior caused by thermal effect. Also, conventional dummy insertion techniques focus on global pattern density for a chip or die. However, these techniques fail to consider, as an index for design or processing, local pattern density around targeted critical circuit blocks, which may cause pattern density non-uniformity. Thus, conventional dummy insertion techniques fail to consider and utilize a rule or model based approach to optimize optical-thermal-electrical effect for devices during processing. Embodiments of the present disclosure, as provided herein, overcome these deficiencies of conventional techniques.

Figure 1B:
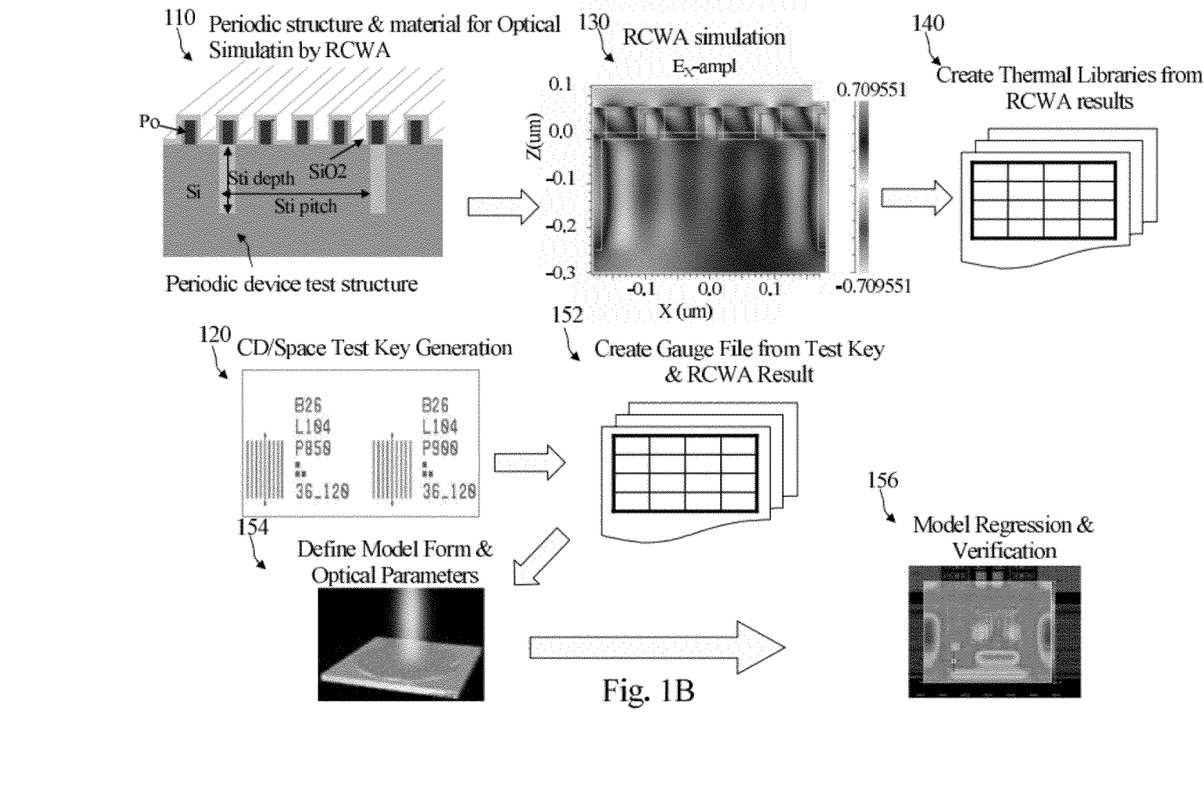

FIG. 1B shows another parameterized cell preparation process flow for optimization of thermal effect, in accordance with embodiments of the present disclosure. As described in reference to FIG. 1A, RCWA may be utilized for thermal simulations including utilization of RTA processing for thermal effect optimization.

In one implementation, referring to FIG. 1B, semiconductor structure 110 comprises a periodic structure and material for optical simulation by RCWA.

The CD/Space test key 120 for the semiconductor structures 110 is generated for RCWA simulation.

As with FIG. 1A, RCWA simulation 130 is performed to generate thermal libraries 140 from RCWA simulation results.

In one implementation, a gauge file 152 is generated from the test key 120 and RCWA simulation results.

Next, a model form and optical parameters are defined 154. In one aspect, overall optical effects are lumped for the layout effect characterization.

Next, model regression and verification is performed 156. In one aspect, the model is verified and refined with real silicon measurements. In one aspect, model regression connects data and information into model form, and the model form is utilized along with optical behavior for simulation.

Figure 1C:
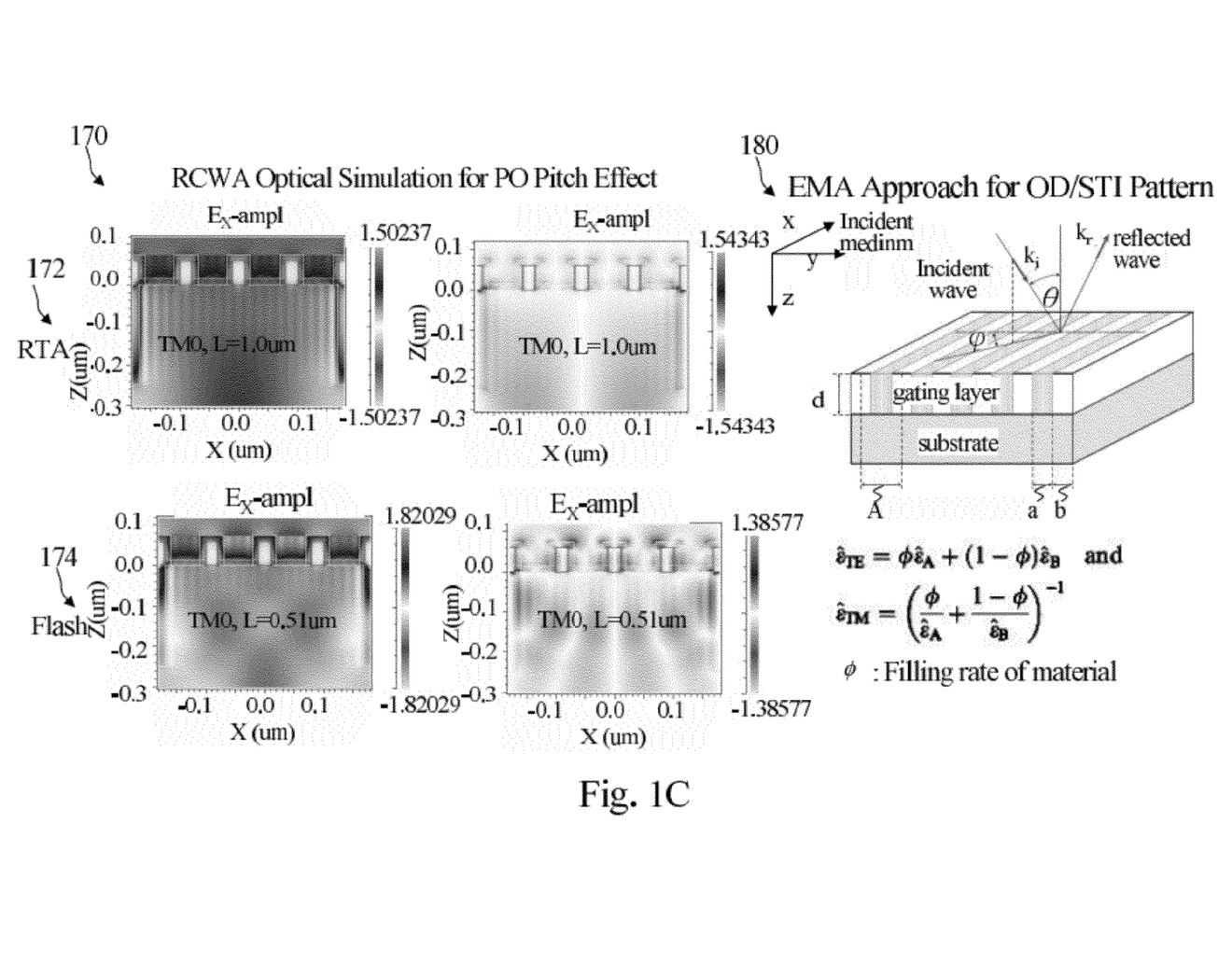

FIG. 1C shows thermal effect model generation and flow for optimization of thermal effect, in accordance with embodiments of the present disclosure.

In one implementation, RCWA optical simulation is performed for PO pitch effect 170 in the reference to the semiconductor structures 110.

In one aspect, RCWA library implementation is utilized for thermal simulations including utilization of RTA processing 172 or flash processing 174 for thermal effect optimization.

In one implementation, Effective Medium Approximation (EMA) 180 may be applied to simplified grating structures for OD/STI patterns.

Figure 2:
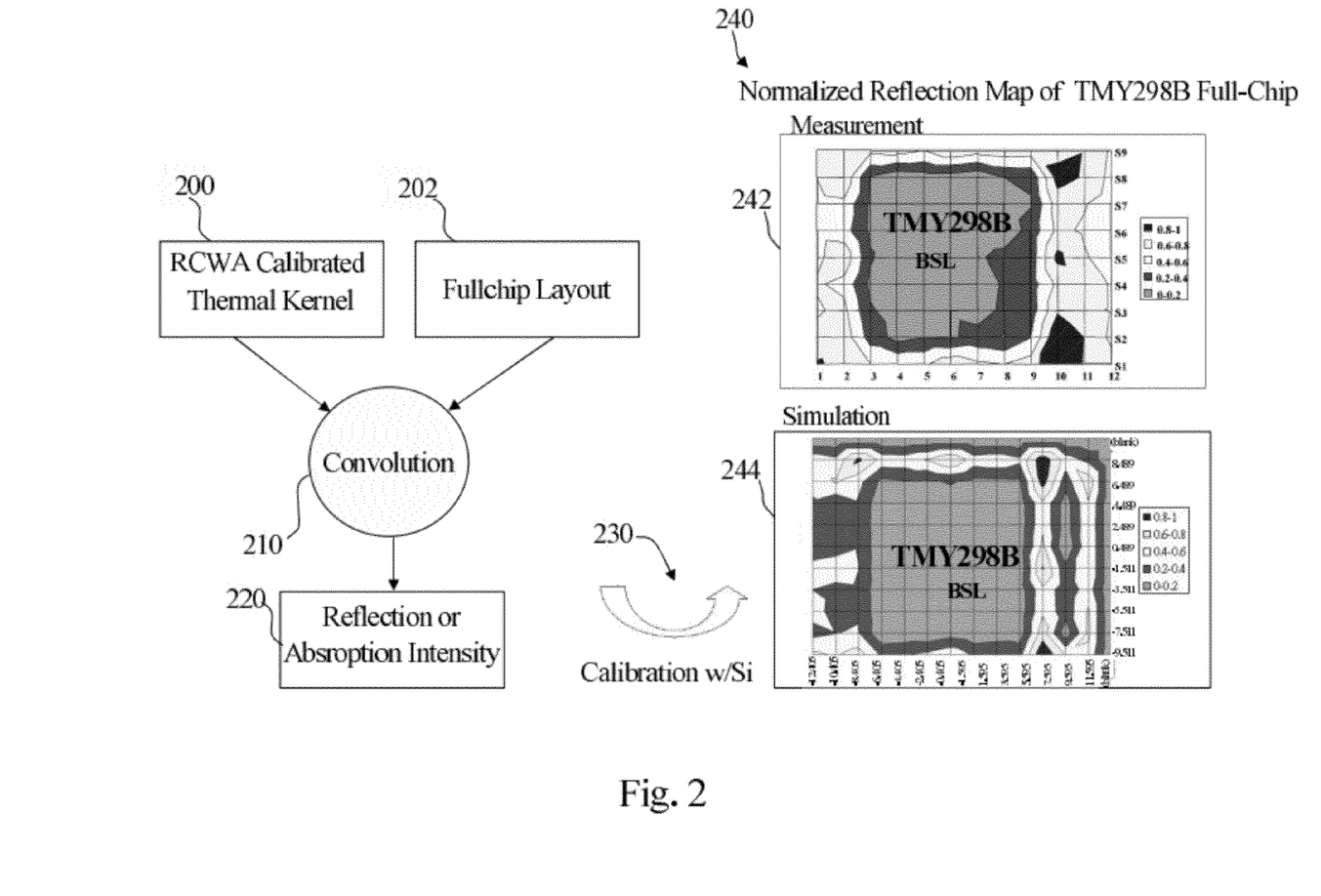
FIG. 2 shows a process flow for generating an empirical thermal kernel, in accordance with embodiments of the present disclosure.

FIG. 2 shows a process flow for generating an empirical thermal kernel, in accordance with embodiments of the present disclosure. In various implementations, the thermal kernel may be generated for one or more annealing processes, such as flash annealing, rapid thermal annealing (RTA), and/or laser spike annealing (LSA), each of which may be utilized for thermal effect optimization, in accordance with embodiments of the present disclosure.

In one embodiment, referring to FIG. 2, mathematical convolution 210 may be utilized to generate reflection or absorption intensity 220 from the RCWA calibrated thermal kernel 200 for one of the annealing processes and the fullchip layout or pattern 202.

For example, mathematical convolution 210 may be utilized to generate the empirical thermal kernel for the RTA process.

1). The RCWA reflection libraries 140 for 1-D STI, oxide regions (OD), and field gate patterns (PO).

2). The setting for RTA; $\lambda=0.4\sim2.6$ um, power spectrum factor, etc.

3). 2-D thermal simulation by the convolution of the thermal kernel and patterns.

In one embodiment, referring to FIG. 2, the reflection or absorption intensity 220 may be calibrated with silicon (Si) 230 to generate normalized reflection maps 240 of fullchip layout, which may utilize a measurement map 242 and a simulation map 244.

For comparison, the measurement and simulation maps 242, 244 utilize a similar wavelength range (e.g., $\lambda<=0.85$ um, measured limitation) and pixel size (e.g., 2 mm).

Figure 3:
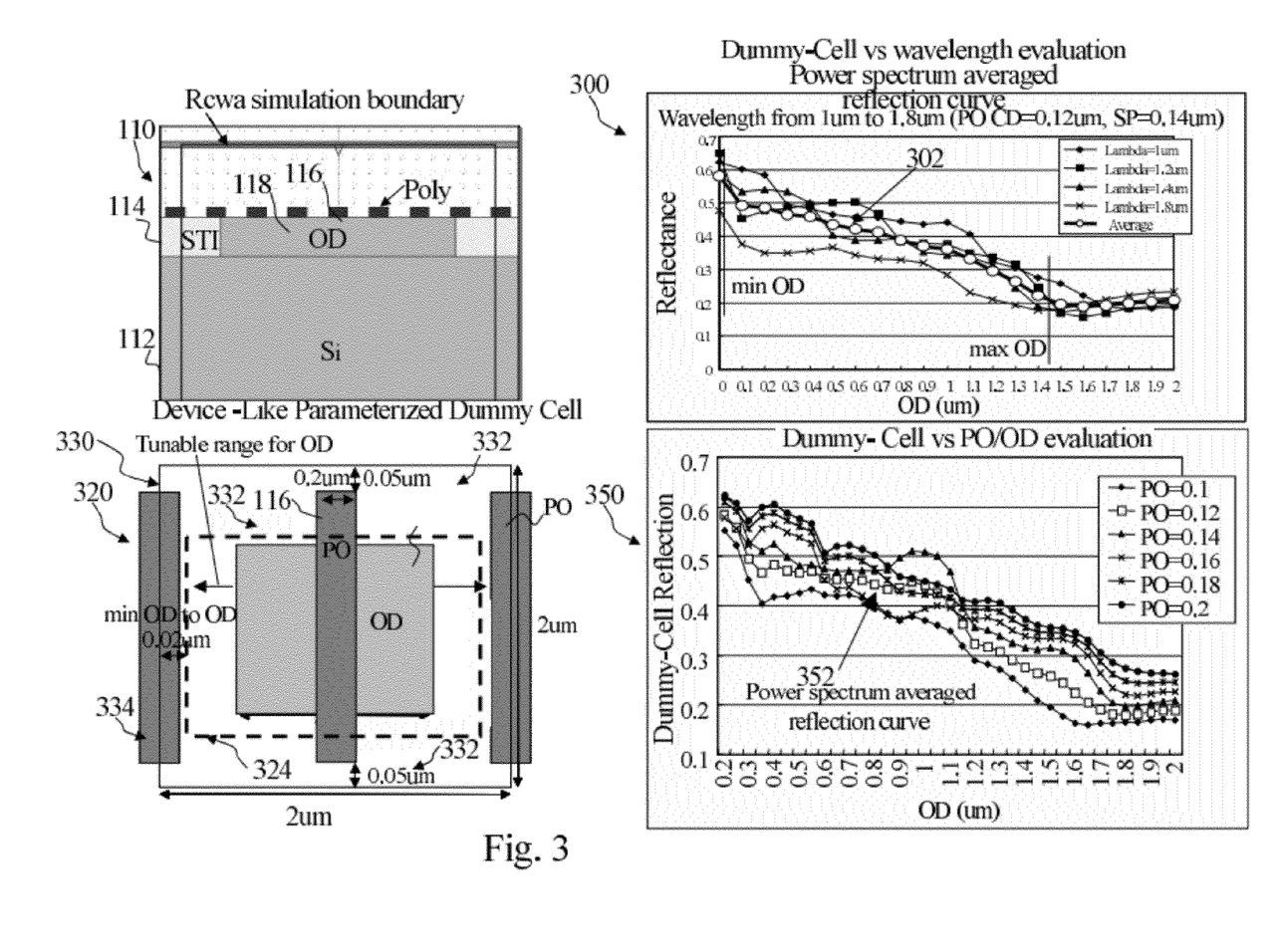
FIG. 3 shows parameterized dummy cell preparation for thermal effect, in accordance with an embodiment of the present disclosure.

FIG. 3 shows parameterized dummy cell preparation for RTA thermal effect, in accordance with an embodiment of the present disclosure. In one aspect, parameterized dummy cell preparation may be referred to as Adaptive Thermal Dummy fill (ATD-fill) for fixed-pitch DPO (e.g., N40 DPO) with adjustable DOD density.

As described in FIG. 1, a 1-D effect may be calculated by RCWA simulation directly for any type of semiconductor structure 110. The semiconductor structure 110 may include various gate features (PO) 116 disposed on substrate 112. STI features 114 formed in the semiconductor substrate 112 represent silicon isolation and define active regions uncovered by isolation features. OD features 118 may define oxide regions where the semiconductor substrate 112 is isolated from gate features 116.

Referring to FIG. 3, an RCWA simulation table 300 is generated to identify a power spectrum average reflection curve 302 based on the dummy cell density versus reflection wavelength evaluation of fullchip simulated layout.

In one embodiment, a top layout view of a device-like parameterized dummy cell 320 is generated to represent one type of dummy cell having a tunable range 322 for OD features 118 indicated by a dashed line 324. A pixel boundary 330 identifying a single cell pixel is shown having, for example, 2 um square dimension. PO features 116 are shown having, for example, 0.2 um by 1.9 um dimensions, where gaps 332 (e.g., 0.05 um) are formed with the pixel boundary 330. For adjacent pixels, a minimum gap 334 (e.g., range between 0.02 um and 0.04 um) from OD feature to OD feature between pixels may be utilized to form a separation between OD features 118 from pixel to pixel.

Dummy cells have no electrical property. Dummy cells are utilized to form a more uniform reflectance or absorbance across the fullchip layout for uniform processing, such as annealing, CMP, etc.

Referring to FIG. 3, a tunable range simulation table 350 is generated to identify a power spectrum average reflection curve 352 based on the dummy cell density versus dummy cell reflection wavelength evaluation of fullchip simulated layout.

Figure 4:
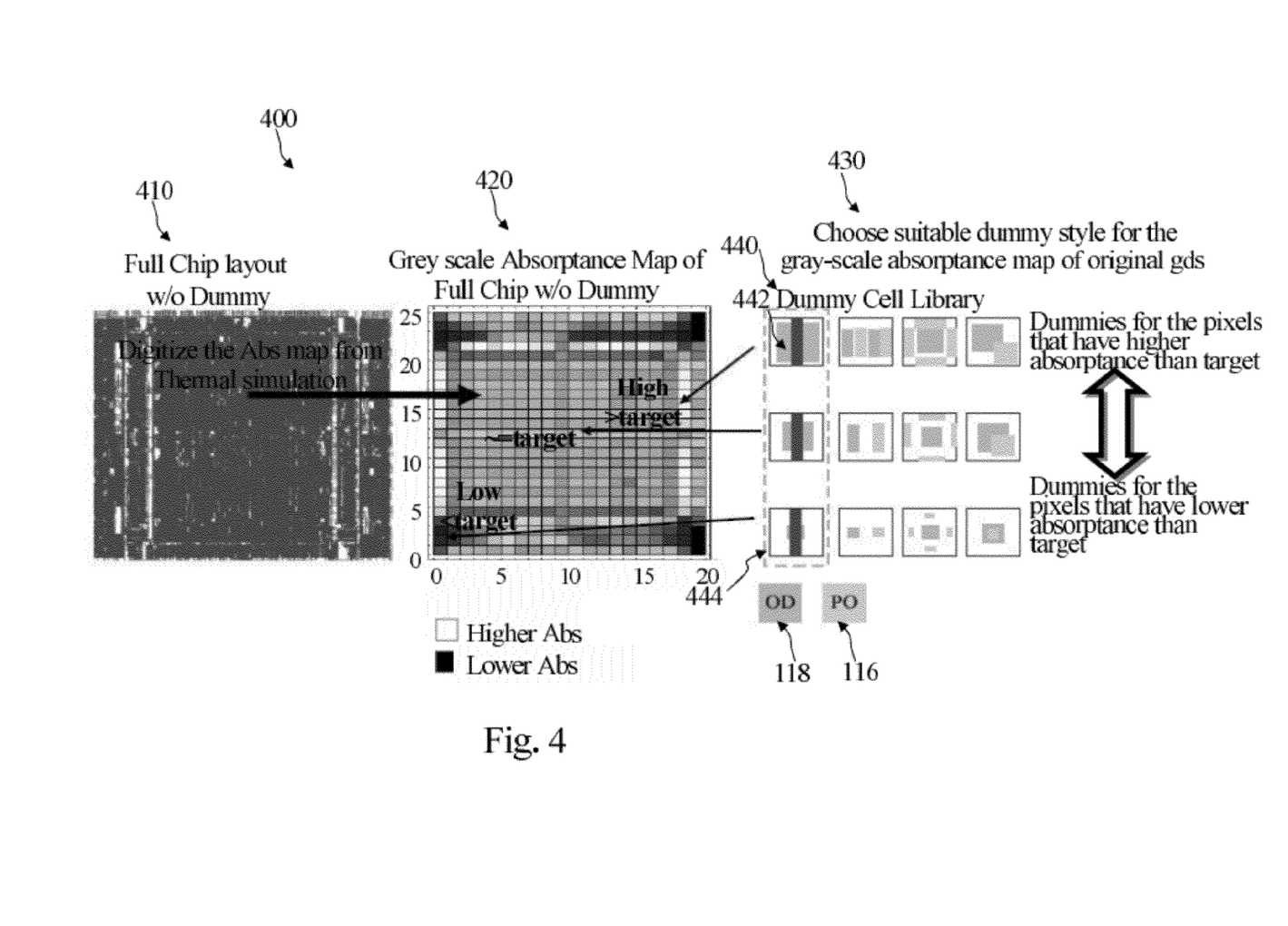
FIG. 4 shows application of adaptive thermal dummy (ATD), in accordance with an embodiment of the present disclosure.

FIG. 4 shows application of adaptive thermal dummy (ATD) insertion 400 to achieve better absorption uniformity of across fullchip, in accordance with an embodiment of the present disclosure.

In one implementation, the methodology for ATD insertion 400 includes:

1). High Absorption Pixel includes Lower Absorption Dummy.

2). Targeted Absorption Pixel includes coordinate Absorption Dummy.

3). Low Absorption Pixel includes Higher Absorption Dummy.

In one example, a fullchip layout without dummy cells utilizes a digitized absorption map 410 from the thermal simulation for each pixel-unit of area in the fullchip layout so as to identify each pixel's absorption value, which is indicated by grey-scale shading.

Next, a grey-scale absorption map 420 of fullchip without dummy cells is generated to show pixel cells in fullchip layout with each pixel having an absorption scale rating, such as a gray-scale shading indication of a higher absorption pixel rating versus a lower absorption pixel rating. In one aspect, the grey-scale absorption map 420 of fullchip without dummy cells is generated after convolution.

Next, suitable dummy cell styles are chosen 430 for the grey-scale absorption map of the original gds file format of the fullchip layout file. In one aspect, the dummy cells are chosen from a dummy cell library 440 of suitable candidates for insertion to each pixel-unit based on the target absorption rating or value to achieve uniform absorption or reflectance map across fullchip. Dummy cells may be chosen from the dummy cell library 440 for pixels that have a higher absorbance than the target absorption value 442, or dummy cells may be chosen from the dummy cell library 440 for pixels that have a lower absorbance than the target absorption value 444. It should be appreciated that dummy cells are separately chosen for each pixel to increase or decrease a pixel's absorption value to thereby form a more uniform absorption across fullchip.

In one aspect, as shown in FIG. 4, the OD features 118 have a tunable range by being variable in size. Dummy cells have no electrical property. Dummy cells are utilized to form a more uniform reflectance or absorbance across the fullchip layout for uniform processing, such as annealing, CMP, etc.

Figure 5:
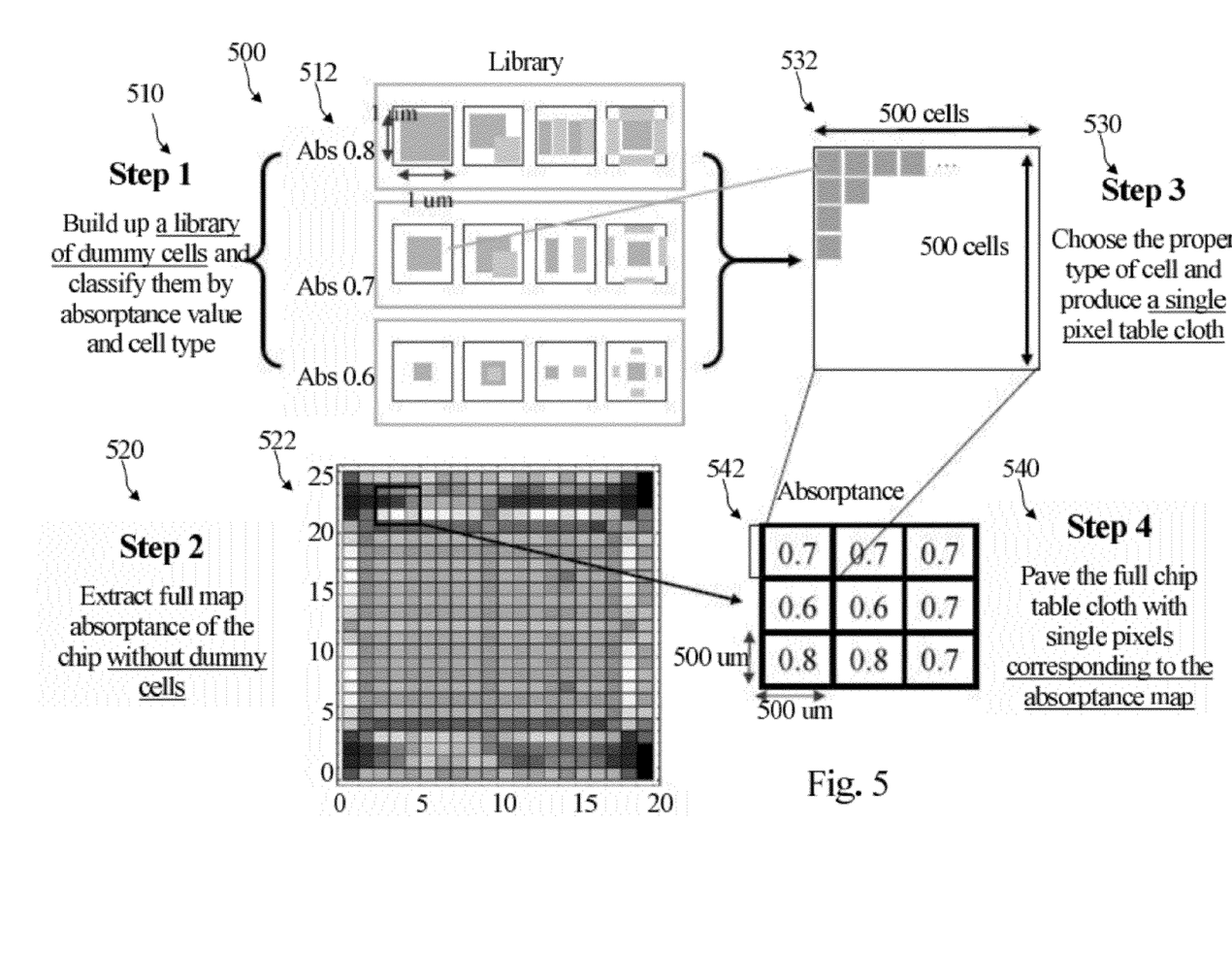
FIG. 5 shows a process flow to generate a target absorption map, in accordance with an embodiment of the present disclosure.

FIG. 5 shows a process flow 500 to generate a target absorption map, in accordance with an embodiment of the present disclosure. For example, an absorption target value for each pixel-unit may be 0.7, wherein each pixel-unit not meeting this target absorption value may receive dummy cell insertion.

In process step 510 of process flow 500, a library 512 of dummy cells is built-up and classified by absorbance value and cell type. Standard dummy cells are catalogued in the dummy cell library.

In process step 520 of process flow 500, a full absorbance map 522 of fullchip without dummy cells is extracted to identify each pixel's absorbance rating with grey-scale absorption rating values.

In process step 530 of process flow 500, a proper type of cell is chosen to produce a single pixel table cloth 532. In one example, the single pixel table cloth 532 represents a grid of 500 by 500 pixels in a fullchip layout.

In process step 540 of process flow 500, the fullchip table cloth 522 is paved with single pixels 542 corresponding to the absorption map 522. As shown in FIG. 5, each pixel in the absorption map has a discrete absorption value, which may be higher, lower, or equal to the target absorption value.

Figure 6:
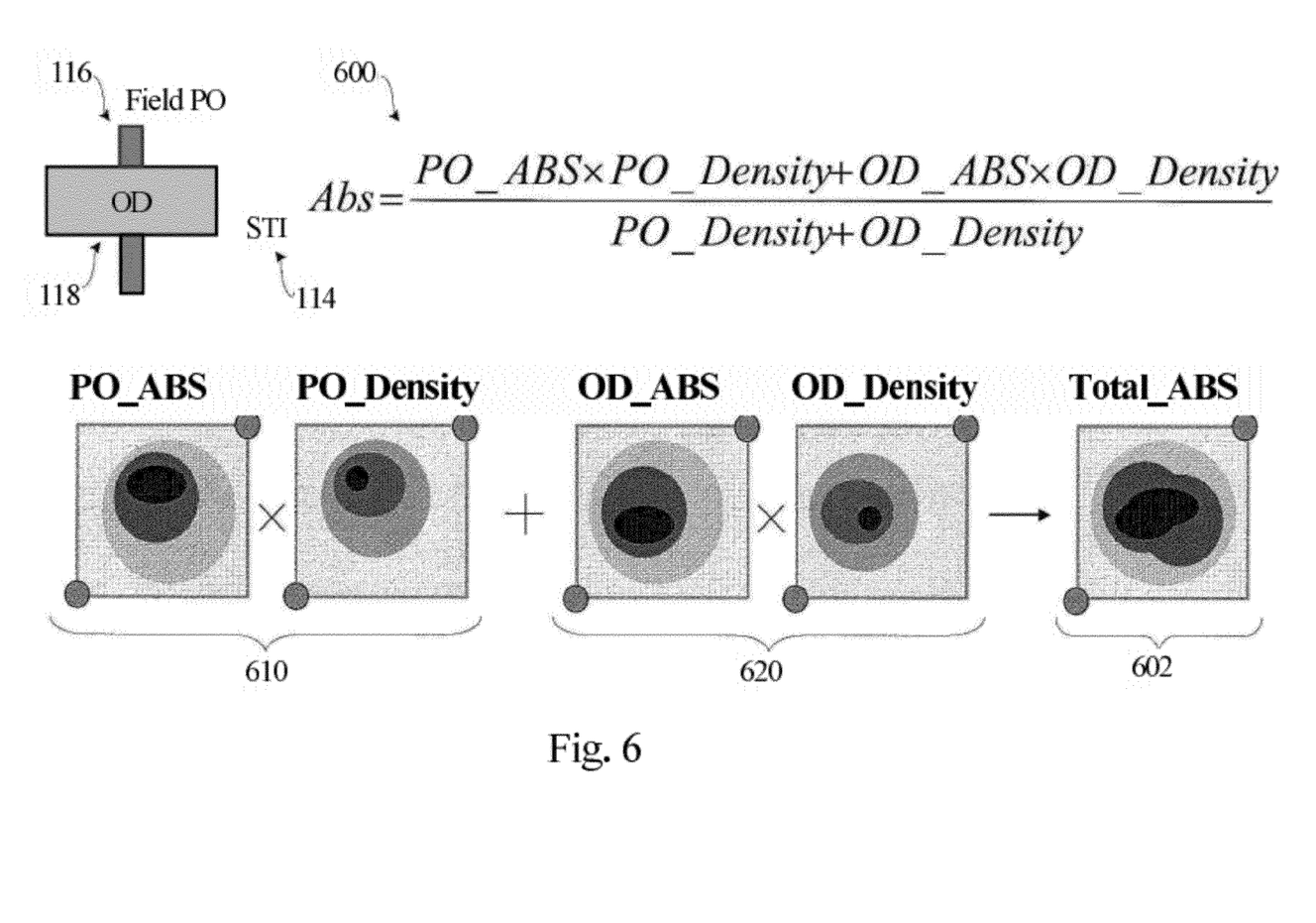
FIG. 6 shows an absorption averaging equation, in accordance with an embodiment of the present disclosure.

FIG. 6 shows an absorption averaging equation 600 for calculating a pattern-density weighting average absorption between field PO absorption and OD absorption, in accordance with an embodiment of the present disclosure. In one aspect, absorption averaging is adapted to average the original layout map with the simulated map, because a two layer absorption map is difficult to obtain. In another aspect, absorption averaging is utilized to find local area absorption in each pixel to add parameterized dummy cells to the local region for uniformity across full chip. In other words, if the absorption value of a local region of a pixel is higher or lower than the target absorption value, then dummy cell features may be added to the local region of the pixel to achieve the target absorption value.

In one implementation, as shown in FIG. 6, absorption averaging equation 600 is as follows:

$$Abs = \frac{PO\_ABS \times PO\_Density + OD\_ABS \times OD\_Density}{PO\_Density + OD\_Density}$$

In one aspect, referring to FIG. 6, total Absorption (Abs) 602 of one pixel is calculated with the product 610 of the PO Absorption (PO_ABS) and PO Density (PO_Density) plus (+) the product 620 of OD Absorption (OD_ABS) and OD Density (OD_Density).

In one embodiment, field PO represents poly-silicon gate features 116, which is part of substrate 112, and OD represents oxide features 118, as described in reference to FIG. 1.

In one example calculation, if PO_ABS=0.6, PO_Density=0.3, OD_ABS=0.7, OD_Density=0.5, then Total_ABS= (0.6*0.3+0.7*0.5)/(0.3+0.5)=0.6625, which is about 0.70.

Figure 7:
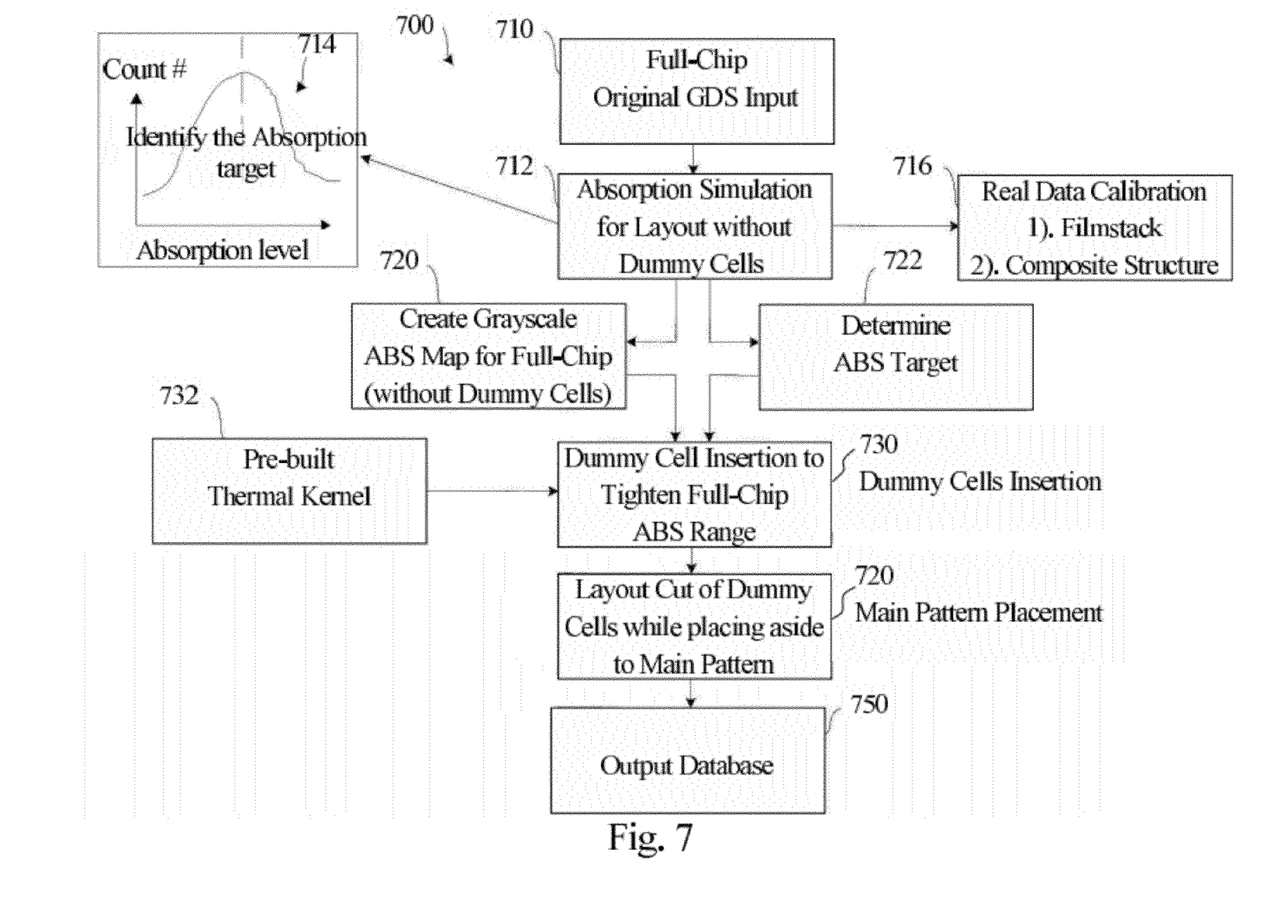
FIG. 7 shows a process compatible thermal/topographic modeling and patterning optimization flow, in accordance with an embodiment of the present disclosure.

FIG. 7 shows a process 700 compatible thermal/topographic modeling and patterning optimization flow, in accordance with an embodiment of the present disclosure. In one example, the process 700 may be utilized for a thermal effect model and flow.

In one implementation, a fullchip original gds (i.e., data type of fullchip layout) may be utilized as an input (block 710).

Next, absorption simulation is performed for fullchip layout without dummy cells (block 712). In one example, conventional dummy cells are removed from the original fullchip layout. The absorption target value is identified 714 via a simulation graph, and real data calibration 716 is achieved from the film stack and composite structure.

Next, gray-scale absorption map is generated for fullchip layout without conventional dummy cells (block 720), and the absorption (ABS) target is determined (block 722).

Next, dummy-cell insertion is performed for each pixel-unit to tighten the fullchip absorption range of the layout (block 730). In one aspect, dummy cells are inserted into each pixel to get close to the absorption target value for each pixel to thereby get close to uniform absorption across fullchip. In another aspect, a pre-built thermal kernel 732 is utilized to perform dummy cell insertion.

Next, layout-cut of dummy-cells is performed for any dummy cells that overlap semiconductor structures while placing aside to main pattern placement (block 740). In one aspect, parameterized dummy cells may be cut from the pixel-unit if these inserted dummy cells overlap any original semiconductor structures within the pixel-unit.

Next, the dummy cell insertion layout is output to an output database (block 750).

Figure 8:
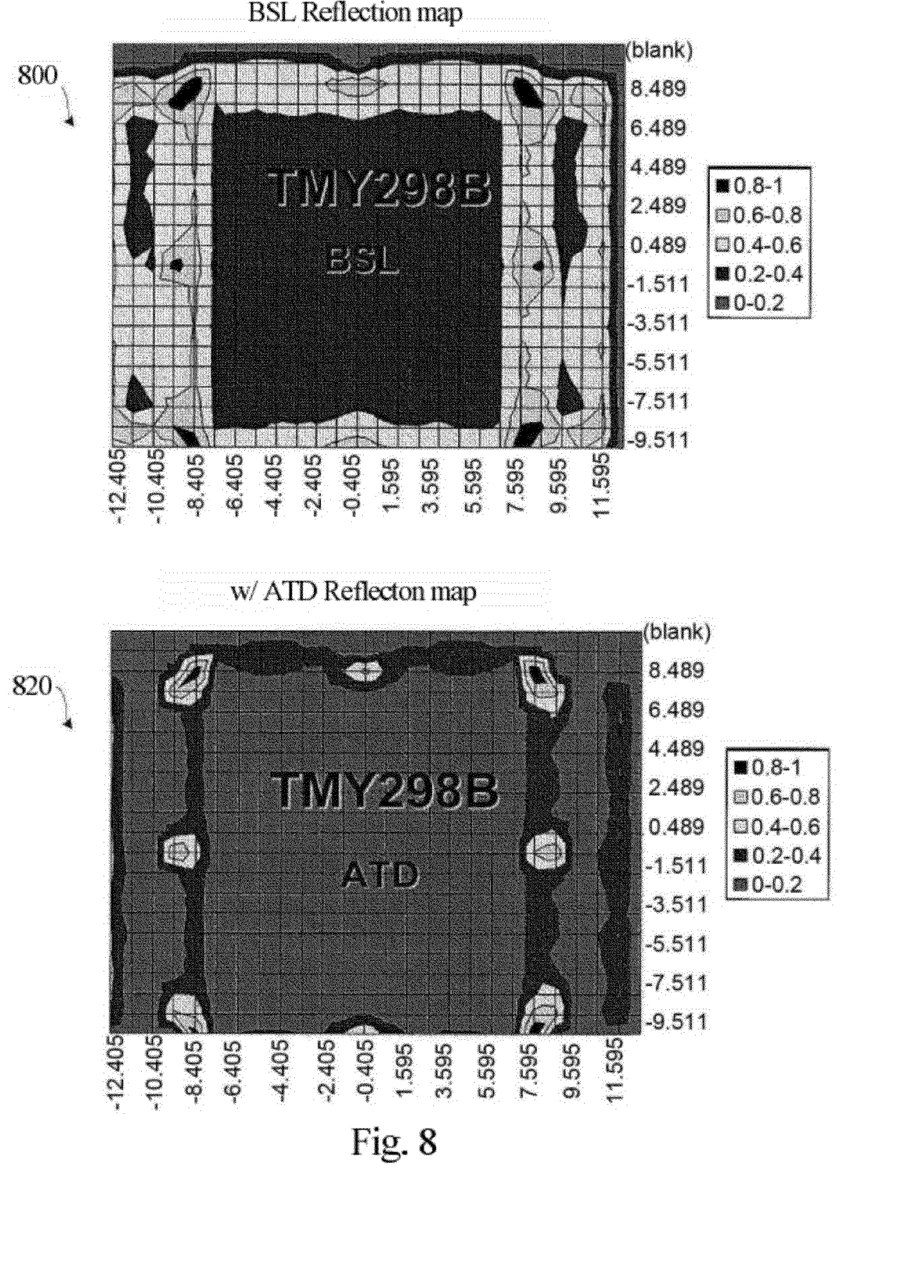
FIG. 8 shows a baseline (BSL) reflection map and an adaptive thermal dummy fill reflection map for comparison, in accordance embodiments of the present disclosure.

FIG. 8 shows a baseline (BSL) reflection map 800 and an adaptive thermal dummy fill (ATD-fill) reflection map 820 for comparison, in accordance with embodiments of the present disclosure. In one aspect, the BSL reflection map 800 represents a reflection map for fullchip layout with conventional dummy cells. The BSL reflection map 800 has no adaptive dummy cell insertion and only conventional dummy cells.

In another aspect, ATD-fill reflection map 820 represents a reflection map for fullchip with parameterized thermal dummy cells for more uniform reflectance across fullchip, in accordance with an embodiment of the present disclosure. The ATD-fill reflection map 820 is generated after insertion of parameterized thermal dummy cells of the present disclosure and after removal of conventional dummy cells.

Figure 9:
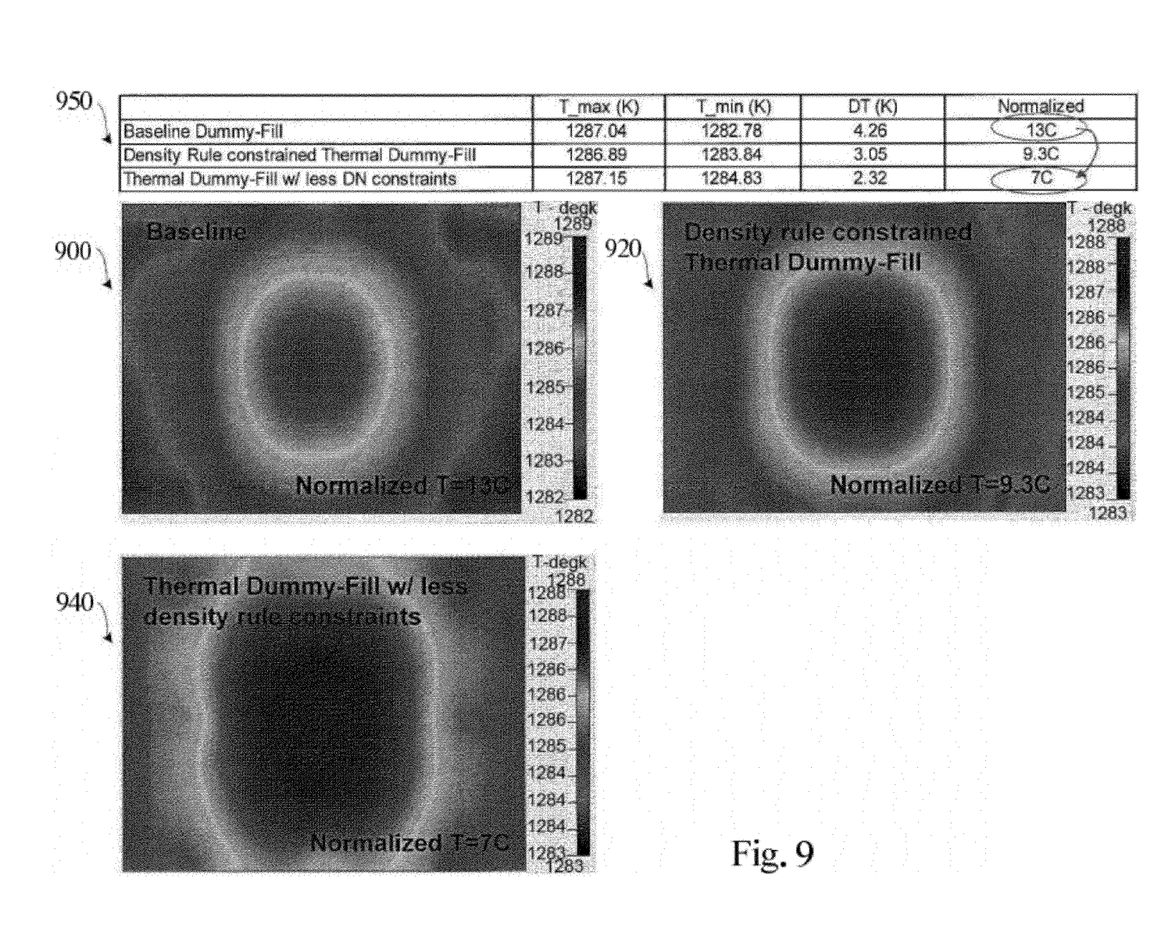
FIG. 9 shows various temperature maps for dummy fill, in accordance with one or more embodiments of the present disclosure.

FIG. 9 shows temperature maps for a baseline (BSL) dummy fill 900, a density rule constrained thermal dummy fill 920, and a density rule less-constrained thermal dummy fill 940, in accordance with one or more embodiments of the present disclosure. FIG. 9 also shows a temperature comparison table for each of the temperature maps 900, 920, 940, in accordance with one or more embodiments of the present disclosure.

The baseline temperature map 900 and corresponding entry in the temperature table 950 shows a normalized temperature variation of about 13° C. As shown in the baseline temperature map 900, conventional dummy fill has a large temperature variation range.

The density rule constrained thermal dummy fill temperature map 920 and corresponding entry in the temperature table 950 shows a normalized temperature variation of about 9.3° C. As shown in the density rule constrained thermal dummy fill temperature map 920, density rule constrained thermal dummy fill in accordance with an embodiment of the present disclosure has a lower temperature variation range.

The density rule less-constrained thermal dummy fill temperature map 940 and corresponding entry in the temperature table 950 shows a normalized temperature variation of about 7° C. As shown in the density rule constrained thermal dummy fill temperature map 920, density rule less-constrained thermal dummy fill in accordance with an embodiment of the present disclosure has an even lower temperature variation range.

Accordingly, embodiments of the adaptive thermal dummy (ATD) fill techniques and processes of the present disclosure provide a lower temperature variation range of each pixel for improved performance of each semiconductor structure over conventional dummy fill techniques and processes.

In accordance with embodiments of the present disclosure, parameterized dummy cell insertion for thermal effect optimization, as provided herein, is compatible with current deep submicron integrated circuit (IC) design flow, which may be referred to as a process/design refinement technique for advanced semiconductor processing. This technique provides a higher degree of freedom during (dummy) polygon insertion for semiconductor foundries and manufacturing companies on logic block/IP and standard cell abutment analysis and design. This technique provides improved performance targeted process adjustment, for example, CMP, CAA, Thermal and Topography optimization for frontend and backend processing. This technique provides customized/adjustable process optimization and may be pre-identified for thermal effect, CMP, and topography uniformity criteria by rules.

In accordance with embodiments of the present disclosure, parameterized dummy cell insertion for thermal effect optimization, as provided herein, provides a customizable and/or adjustable process uniformity re-targeting and adjustment for fullchip layout. In one aspect, process uniformity based patterning and dummy-filling are critical for current deep micron device engineering. The variation of processes are killers during process. This technique and flow may be pre-identified as a fundamental patterning optimization platform for process and design rules. This technique allows for new process-uniformity friendly polygons to be added-on and corrected around devices or circuits.

In accordance with embodiments of the present disclosure, parameterized dummy cell insertion for thermal effect optimization, as provided herein, provides silicon calibrated process-enhancement. The behavior of thermal distribution and geometry-based libraries are input components of this technique during performance or thermal effect optimization. The thermal effect, CMP, topography aware patterning, and retargeting criteria or rules are applied to calculate and correct final target, such as the thermal effect target. In one aspect, performance-aware refers to uniformity control about thickness, thermal, and/or some other related behaviors during device processing in VLSI. In another aspect, this technique provides local process uniformity control across chip or around the critical circuit block to ensure stable electrical properties and process uniformity. In another aspect, this technique provides integrated layout optimization through the overall semiconductor process.

In accordance with embodiments of the present disclosure, parameterized dummy cell insertion for thermal effect optimization, as provided herein, provides an efficient and cost-effective dummy-fill process that improves the yield of manufacturing and simplifies current complicated IC design and process flow. This technique improves process uniformity across chip by adjusting parameterized dummy-cells locally.

As described herein, embodiments of the present disclosure relate to a method for semiconductor processing comprising providing an integrated circuit (IC) design layout with defined pixel-units, simulating thermal effect to the IC design layout including each pixel-unit, generating a thermal effect map of the IC design layout including each pixel-unit, determining a target absorption value for the IC design layout based on the thermal effect map, and performing thermal dummy cell insertion to each pixel-unit of the IC design layout based on the determined target absorption value.

In various implementations, thermal effect simulation may be performed for the IC design layout without thermal dummy cells. The thermal effect map may comprise a gray-scale absorption map based on the thermal effect simulation performed for the IC design layout without thermal dummy cells. The target absorption value may be determined from the thermal effect simulation of the IC design layout without thermal dummy cells. The thermal dummy cell comprises a tunable absorption value range. In one implementation, a thermal dummy cell may be inserted into each pixel-unit to get close to the absorption target value for each pixel-unit to thereby get close to a uniform absorption value across the IC design layout. The thermal effect map may identify absorption or reflection for each pixel-unit of the IC design layout, and wherein the thermal effect map comprises an absorption map or a reflection map of the IC design layout.

In various implementations, the method may further include determining a simulated absorption value for each pixel-unit of the IC design layout. Thermal dummy cell insertion may be performed for each pixel-unit based on the simulated absorption value and the target absorption value. In one aspect, determining the simulated absorption value for each pixel-unit may include calculating a pattern weighting absorption average of the IC design layout to determine a local area absorption value for each pixel-unit for thermal dummy cell insertion to achieve the target absorption value for each pixel-unit. The method may further include modifying the structure of the thermal dummy cell prior to insertion if the thermal dummy cell overlaps a semiconductor structure within the boundary of the pixel-unit and/or generating a thermal dummy cell insertion layout for the IC design layout, and storing the thermal dummy cell insertion layout in a memory component. The method may further include simulating electrical performance to the IC design layout based on the simulating thermal effect and/or performing thermal dummy cell insertion to the IC design layout based on the simulating electrical performance.

As described herein, embodiments of the present disclosure relate to method for semiconductor processing comprising providing an integrated circuit (IC) design layout with defined pixel-units, measuring thermal effect to the IC design layout including each pixel-unit, determining absorption intensity for the IC design layout including each pixel-unit, generating a gray-scale absorption map for the IC design layout including each pixel-unit, each pixel-unit having a local area absorption value, determining a target absorption value for the IC design layout based on the gray-scale absorption map, and performing thermal dummy cell insertion to each pixel-unit of the IC design layout based on the local area absorption value of each pixel-unit and the determined target absorption value for the IC design layout.

In various implementations, thermal effect measurement may be performed for the IC design layout without thermal dummy cells, the gray-scale absorption map is based on the thermal effect measurement performed for the IC design layout without thermal dummy cells, and the target absorption value is determined from the thermal effect measurement of the IC design layout without thermal dummy cells. In one aspect, a thermal dummy cell is inserted into each pixel-unit to get close to the absorption target value for each pixel-unit to thereby get close to a uniform absorption value across the IC design layout. The method may include modifying the structure of the thermal dummy cell prior to insertion if the thermal dummy cell overlaps a semiconductor structure within the boundary of the pixel-unit, generating a thermal dummy cell insertion layout for the IC design layout, and storing the thermal dummy cell insertion layout in a memory component.

As described herein, embodiments of the present disclosure relate to a method for semiconductor processing comprising providing an integrated circuit (IC) design layout patterned by pixel-units without thermal dummy cells, simulating thermal effect to the IC design layout including each pixel-unit without thermal dummy cells, generating a reflectance map of the IC design layout including each pixel-unit without thermal dummy cells, determining a local area absorption value for each pixel-unit without thermal dummy cells for uniform reflectance across the IC design layout, determining a target absorption value for the IC design layout for uniform reflectance across the IC design layout, performing thermal dummy cell insertion to each pixel-unit of the IC design layout based on the determined target absorption value, modifying the structure of the thermal dummy cell if the thermal dummy cell overlaps a semiconductor structure within the boundary of the pixel-unit, generating a thermal dummy cell insertion layout for the IC design layout, and storing the thermal dummy cell insertion layout in a memory component.

In various implementation, a thermal dummy cell may be inserted into each pixel-unit to get close to the absorption target value for each pixel-unit to thereby get close to the uniform absorption value across the IC design layout. In one aspect, the thermal dummy cell comprises a tunable absorption value range.

Although embodiments of the present disclosure have been described, these embodiments illustrate but do not limit the disclosure. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

What is claimed is:

1. A method comprising:
    receiving an integrated circuit (IC) design layout with a plurality of defined pixel-units, wherein a first pixel unit from the plurality of defined pixel-units includes a semiconductor structure;
    simulating, by a computer, a thermal effect to the IC design layout for each pixel-unit;
    generating a thermal effect map of the IC design layout for each pixel-unit;
    determining a target absorption value for the IC design layout based on the thermal effect map;
    identifying placement for thermal dummy cells to be added to the IC design layout based on the determined target absorption value;
    determining that the identified placement for a first thermal dummy cell from the thermal dummy cells overlaps with the semiconductor structure of the first pixel unit;
    modifying the first thermal dummy cell such that the first dummy cell does not overlap the semiconductor structure of the first pixel unit when inserted into the IC design;
    inserting the thermal dummy cells, including the modified first thermal dummy cell, the IC design layout based on the determined target absorption value; and
    wherein a thermal dummy cell is inserted into each pixel-unit to get close to the absorption target value for each pixel-unit to thereby get close to a uniform absorption value across the IC design layout.

2. The method of claim 1, wherein thermal effect simulation is performed for the IC design layout prior to insertion of any thermal dummy cells.

3. The method of claim 1, wherein the thermal effect map comprises a gray-scale absorption map based on the thermal effect simulation performed for the IC design layout without thermal dummy cells.

4. The method of claim 1, wherein the target absorption value is determined from the thermal effect simulation of the IC design layout without thermal dummy cells.

5. The method of claim 1, further comprising determining a simulated absorption value for each pixel-unit.

6. The method of claim 5, wherein thermal dummy cell insertion is performed for each pixel-unit based on the simulated absorption value and the target absorption value.

7. The method of claim 5, wherein determining the simulated absorption value for each pixel-unit includes calculating a pattern weighting absorption average of the IC design layout to determine a local area absorption value for each pixel-unit for thermal dummy cell insertion to achieve the target absorption value for each pixel-unit.

8. The method of claim 1, wherein the thermal dummy cell has a tunable absorption value range.

9. The method of claim 1, further comprising generating a thermal dummy cell insertion layout for the IC design layout, and storing the thermal dummy cell insertion layout in a memory component.

10. The method of claim 1, wherein the thermal effect map identifies absorption or reflection for each pixel-unit of the IC design layout, and wherein the thermal effect map comprises an absorption map or a reflection map of the IC design layout.

11. The method of claim 1, further comprising:
simulating electrical performance to the IC design layout based on the simulating thermal effect; and
performing thermal dummy cell insertion to the IC design layout based on the simulating electrical performance.

12. The method of claim 1, further comprising removing a plurality of original dummy cells from the IC design layout prior to simulating, by the computer, a thermal effect to the IC design layout for each pixel-unit.

13. A method comprising:
receiving an integrated circuit (IC) design layout with a plurality of defined pixel-units and a plurality of original dummy cells;
removing the plurality of original dummy cells from the IC design layout;
after removing the plurality of original dummy cells from the IC design layout, measuring a thermal effect to the IC design layout including each pixel-unit;
determining, by using a computer, absorption intensity for the IC design layout including each pixel-unit;
generating a gray-scale absorption map for the IC design layout including each pixel-unit, each pixel-unit having a local area absorption value;
determining a target absorption value for the IC design layout based on the gray-scale absorption map;
performing thermal dummy cell insertion to each pixel-unit of the IC design layout based on the local area absorption value of each pixel-unit and the determined target absorption value for the IC design layout; and
wherein a thermal dummy cell is inserted into each pixel-unit to get close to the absorption target value for each pixel-unit to thereby get close to a uniform absorption value across the IC design layout.

14. The method of claim 13, wherein:
the thermal effect measurement is performed for the IC design layout without thermal dummy cells,
the gray-scale absorption map is based on the thermal effect measurement performed for the IC design layout without thermal dummy cells, and
the target absorption value is determined from the thermal effect measurement of the IC design layout without thermal dummy cells.

15. The method of claim 13, further comprising:
modifying the structure of the thermal dummy cell prior to insertion if the thermal dummy cell overlaps a semiconductor structure within a boundary of the pixel-unit;
generating a thermal dummy cell insertion layout for the IC design layout; and
storing the thermal dummy cell insertion layout in a memory component.

16. A method comprising:
receiving an integrated circuit (IC) design layout including a plurality of pixel-units that are not thermal dummy cells;
simulating, by a computer, a thermal effect to the IC design layout including each of the plurality of pixel-units;
generating a reflectance map of the IC design layout including each of the plurality of pixel-units;
determining a local area absorption value for each of the plurality of pixel-units, for uniform reflectance across the IC design layout;
determining a target absorption value for the IC design layout for uniform reflectance across the IC design layout;
identifying a placement for one or more thermal dummy cells to be added to the IC design layout based on the determined target absorption value;
modifying the placement or structure of the thermal dummy cells if a thermal dummy cell overlaps a semiconductor structure within a boundary of the pixel-unit;
after modifying, inserting the thermal dummy cells into the IC design layout;
wherein a thermal dummy cell is inserted into each pixel-unit to get close to the absorption target value for each pixel-unit to thereby get close to a uniform absorption value across the IC design layout; and
storing the IC design layout with the thermal dummy cells in a memory component.

17. The method of claim 16, wherein a thermal dummy cell is inserted into each of the plurality of pixel-units to improve the absorption target value for each pixel-unit and to improve the uniform absorption value across the IC design layout.

18. The method of claim 16, wherein the thermal dummy cell has a tunable absorption value range.

* * * * *